United States Patent [19]
Sponseller

[11] 3,796,557
[45] Mar. 12, 1974

[54] PRECISION GLASS PRESSING MOLD AND METHOD OF MOLDING GLASS
[75] Inventor: Harold P. Sponseller, Toledo, Ohio
[73] Assignee: Owens-Illinois, Inc., Toledo, Ohio
[22] Filed: Mar. 6, 1972
[21] Appl. No.: 231,990

[52] U.S. Cl............................ 65/77, 65/76, 65/250, 65/320
[51] Int. Cl............................................. C03b 11/16
[58] Field of Search ......... 65/76, 77, 250, 247, 320, 65/321

[56] References Cited
UNITED STATES PATENTS
1,543,725  6/1925  Roe...................................... 65/321
3,150,951  9/1964  Mayhew............................. 65/321 X
3,171,732  3/1965  Anderson.......................... 65/321 X
1,021,043  3/1912  Hoffman............................... 65/250

Primary Examiner—Arthur D. Kellogg
Attorney, Agent, or Firm—Steve M. McLary; E. J. Holler

[57] ABSTRACT

Apparatus and method for precision molding of glass articles. A glass mold for the pressing of precision glass articles is made with a short stroke piston built into the bottom of the mold in an area where material will be trimmed away later. In addition, the mold cavity configuration is defined by a series of mold inserts which, when assembled, have between them small vacuum slots connecting with a vacuum channel formed within the mold. During the initial forming cycle, excess glass in the mold charge is displaced into the cylinder of the short stroke piston in the bottom of the mold. Then, the short stroke piston is pressed upward forcing glass into and thereby filling all of the recesses within the mold to an exact degree. Any excess material will remain in the cylinder of the short stroke piston and is later trimmed away. In this manner, precision parts may be molded from glass with a degree of accuracy and with a complexity of external detail previously unobtainable.

14 Claims, 6 Drawing Figures

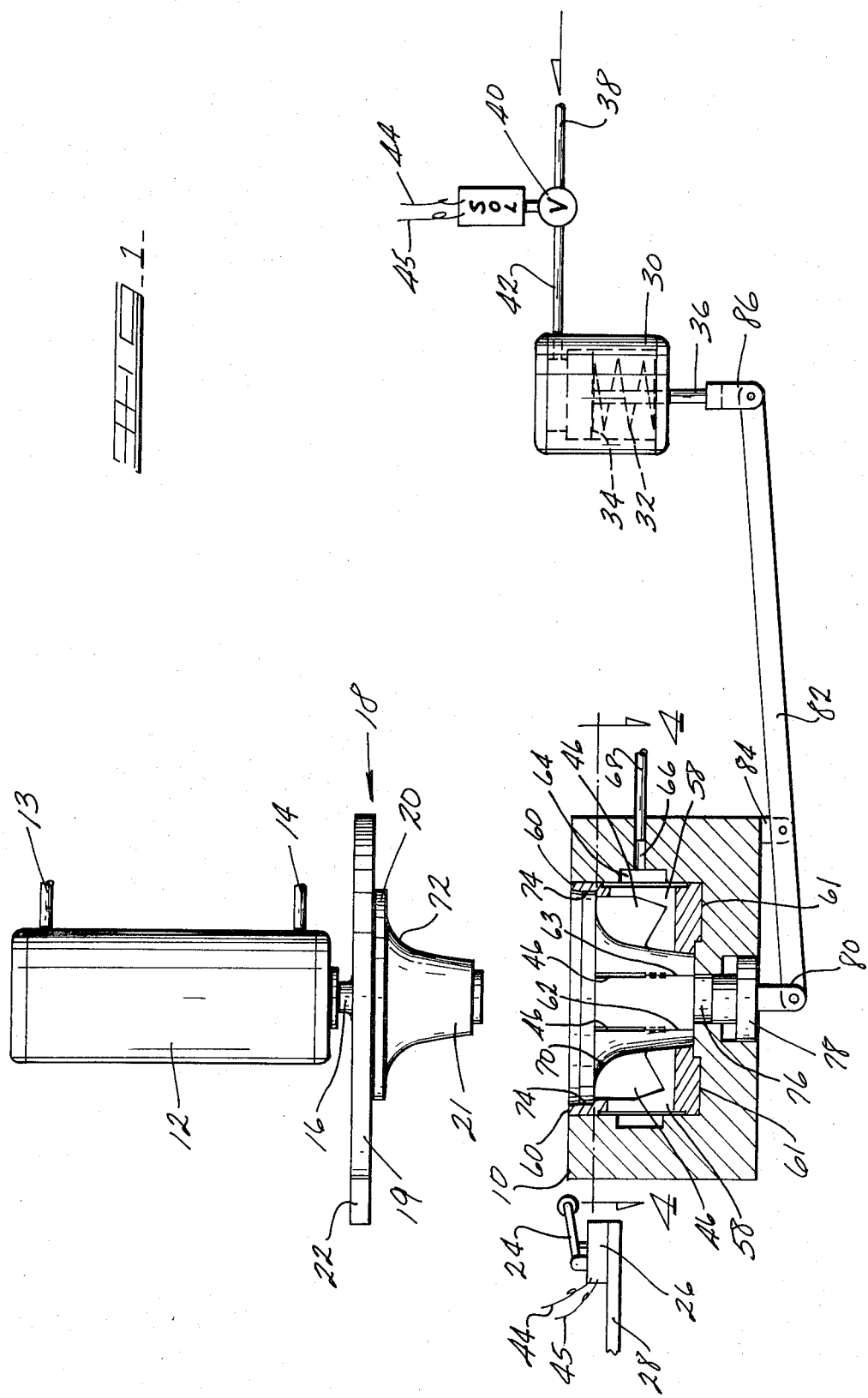

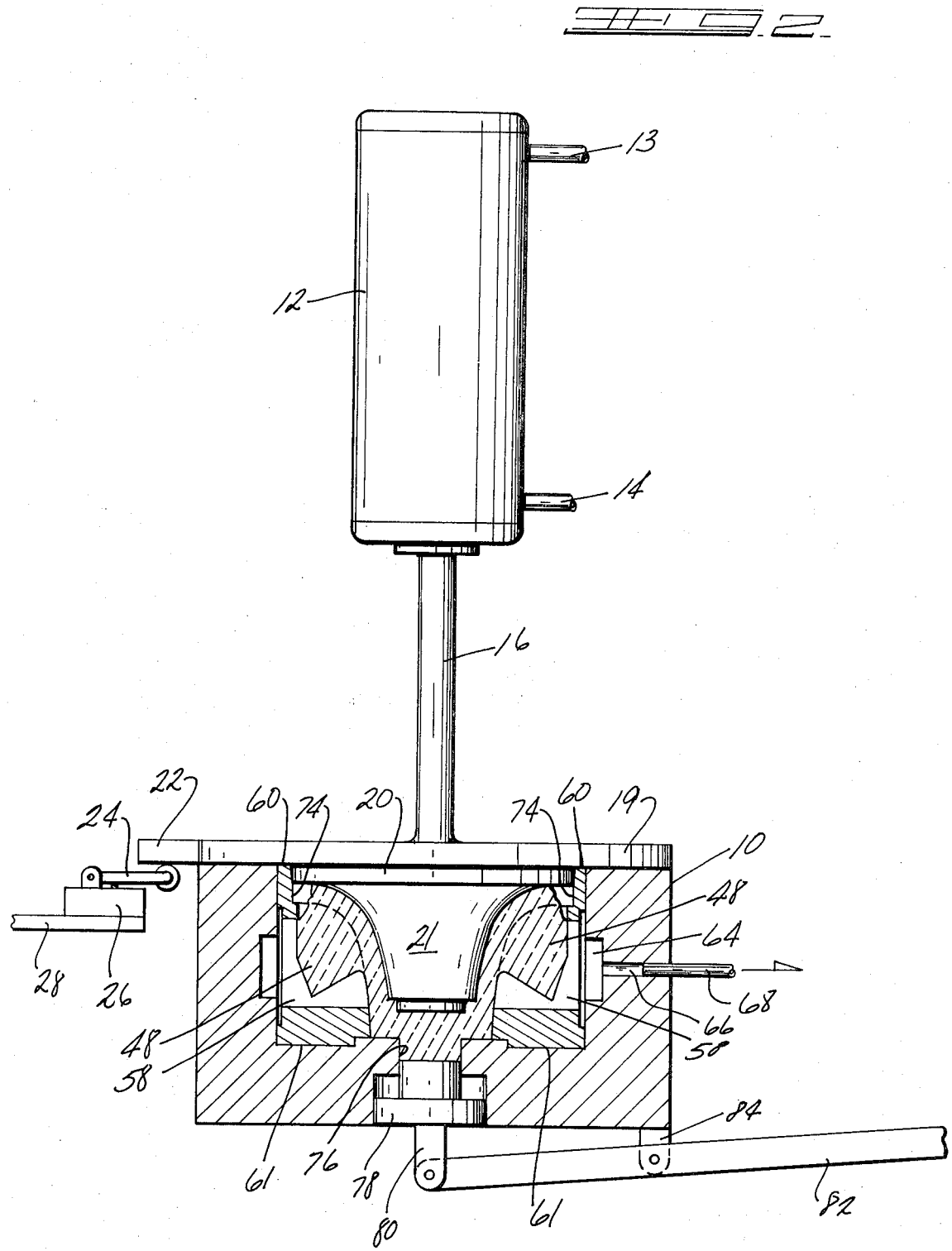

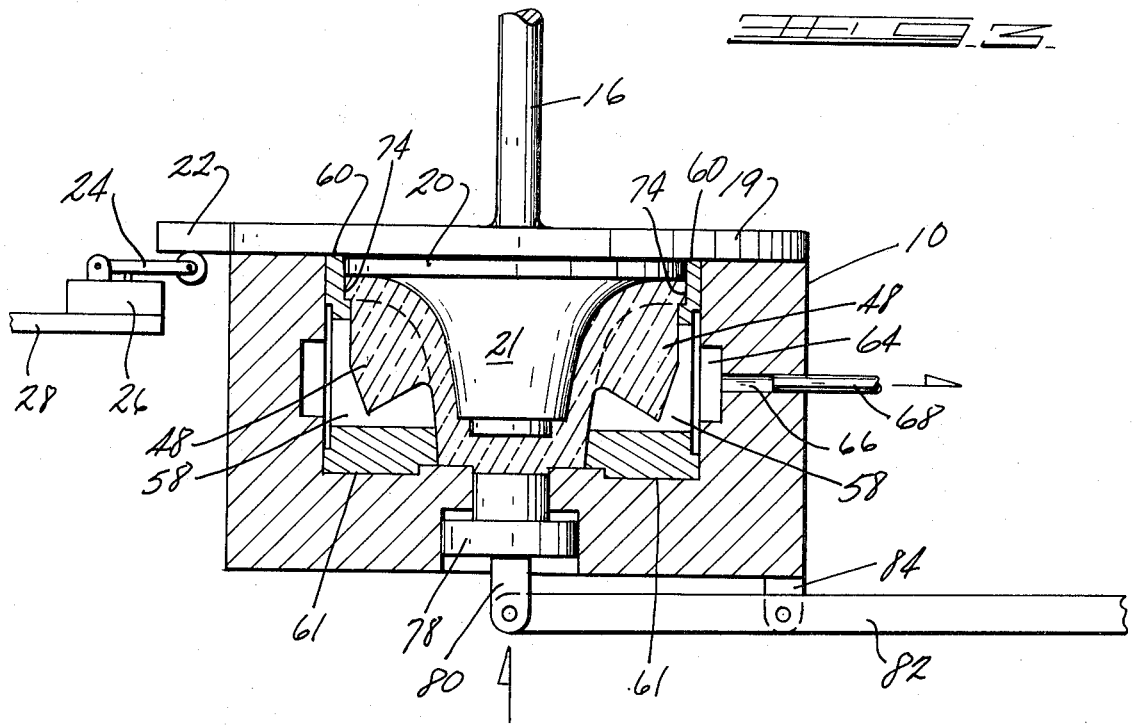
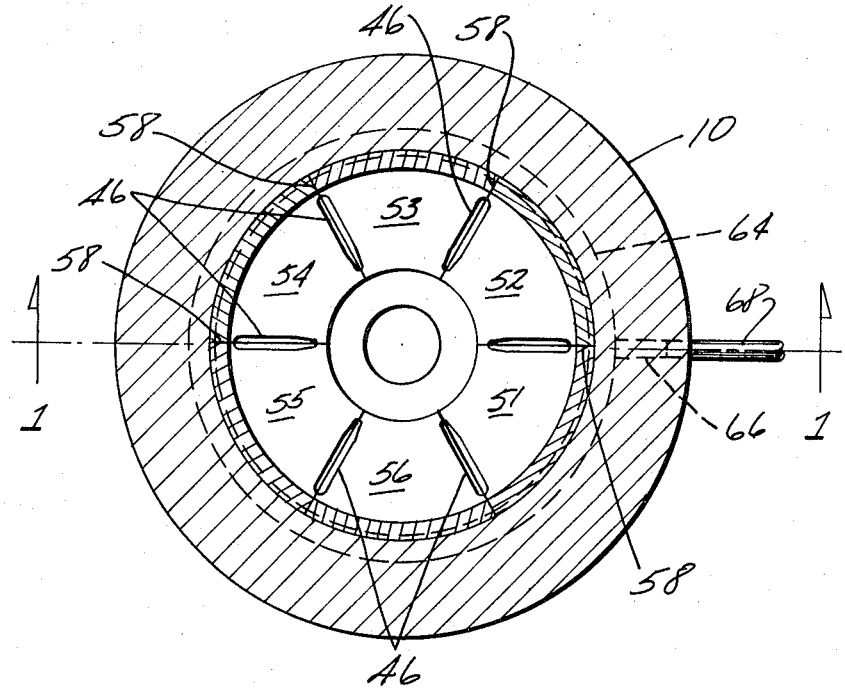

PRECISION GLASS PRESSING MOLD AND METHOD OF MOLDING GLASS

BACKGROUND OF THE INVENTION

This invention generally relates to glass pressing molds. More specifically, this invention relates to a closed glass pressing mold, in which the final press is achieved by a short stroke piston built into the bottom of the mold. Most specifically, this invention relates to a glass pressing mold which allows excess material to be forced into an area where such material may be later removed and in which the final pressing of the glass within the mold to the exact configuration desired is achieved by a short stroke piston built into the bottom of the mold with a vacuum assist built into the mold.

Many glass pressing molds presently use font molds which vent to the atmosphere and excess material will appear in areas which will require after-finishing; these areas being frequently at critical locations. Other glass pressing molds simply hide excess material in thicker walls of the parts that are pressed. Font molds do not permit the high pressure required to fill complex shapes and obtain surface detail within a glass article. Therefore, the complexity of shapes and the precision with which glass articles could be pressed has been limited by the inability of the glass molds to properly distribute excess material in the molten glass charge and the inability to achieve sufficient pressure to completely fill a complex cavity. The method and apparatus disclosed in the present application solves both these problems and allows glass parts to be pressed with great precision into intricate shapes.

SUMMARY OF THE INVENTION

This invention is an apparatus and method for precision pressing of glass articles. A charge of molten glass is delivered into the article defining cavity of a mold. An opening in the lower portion of the mold cavity is provided with a movable means for applying a secondary pressing force to the glass charge after the application of a primary pressing force to the glass. The movable means is provided with a power means to provide pressing pressure or force. The power means is activated to provide the secondary pressing stroke by a control means responsive to the completion of the primary pressing stroke. Any excess glass in the molten glass charge is initially pressed through the opening in the lower portion of the mold cavity. A part of this excess is pressed back into the mold cavity by the secondary pressing stroke to completely fill the cavity. Any residual, excess glass not pressed back appears as a small projection which is ground off of the finished article.

BRIEF DESCRIPTION OF THE DRAWINGS

FIG. 1 is a side elevational view, with the mold member shown in cross section taken generally along the line 1—1 in FIG. 4, of a schematic representation of the apparatus of the present invention prior to the initial pressing stroke;

FIG. 2 is a side elevational view, on an enlarged scale, of the primary plunger and mold as shown in FIG. 1 with the primary plunger in its fully engaged position after a glass charge has been fed into the mold;

FIG. 3 is a view identical to FIG. 2, except that the secondary plunger has been raised to completely fill the cavity of the mold;

FIG. 4 is a cross sectional view, on an enlarged scale, of the mold of the present invention taken along the line 4—4 in FIG. 1;

DETAILED DESCRIPTION OF THE DRAWINGS

Figure 5:
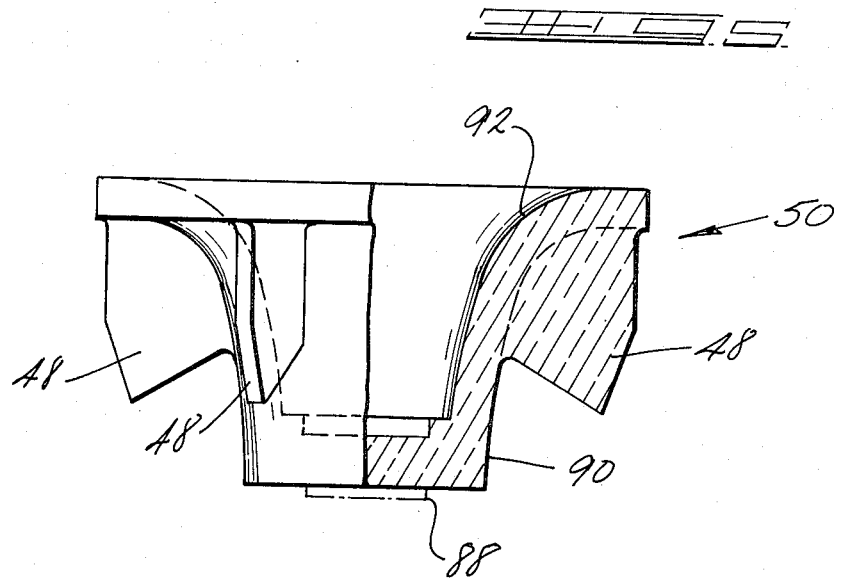
FIG. 5 is a side elevational view, partially in cross section, of an article made by the apparatus of the present invention.

FIG. 1 illustrates, in a schematic fashion, the major components of the apparatus of the present invention. A main mold member 10 receives gobs of molten glass and defines the final shape of the article to be molded from the glass. A primary pressing cylinder 12 positioned over the main mold member 10 is supplied with operating fluid through pipes 13 and 14. The primary cylinder 12 may be either hydraulically or pneumatically operated. The flow of fluid to the primary cylinder 12 is controlled in a conventional manner by a control system not shown to provide an initial pressing force for molten glass charges dropped into the mold 10. The pressing force from the primary cylinder 12 is provided through a cylinder rod 16 which is attached to a primary plunger 18. The primary plunger 18 has at least three distinct portions. These portions are a mold seat ring 19, an upper surface ring 20, and a cavity forming plug 21. In addition, a switch actuating arm 22 is carried by the mold seat ring 19. As will be seen in FIGS. 2 and 3, the switch actuating arm 22 is designed to move an operating arm 24 of a switch 26 to energize the switch 26 when the primary cylinder 12 has operated to place the mold seat ring 19 in position on the upper part of the mold 10. The switch 26 is mounted on a switch bracket 28 adjacent the upper portion of the mold 10 in such a position that the operating arm 24 will be depressed by the switch actuating arm 22 when the mold seat ring 19 is in position on the upper portion of the mold 10. A secondary pressing cylinder 30 is used to supply the final pressing force to a molten glass charge delivered to the mold 10. The secondary pressing cylinder 30 is of a type which is normally spring loaded in one direction. A spring 32 is seen in phantom lines within the confines of the pressing cylinder 30. The spring 32 holds a piston 34 contained within the cylinder 30 in such a position that an operating rod 36 carried by the piston 34 is held in a normally retracted position. Air under pressure is supplied from a source not shown to an inlet pipe 38 connected to a solenoid valve 40. The outlet pipe 42 from the solenoid valve 40 is connected to the upper portion of the secondary pressing cylinder 30. The solenoid valve 40 is of a normally closed construction, and opens to admit air into the secondary pressing cylinder 30 only when it receives an electrical signal from the switch 26. The electrical signal from the switch 26 to the solenoid valve 40 is transmitted by suitable electrical wiring 44 and 45. When the air under pressure is admitted through the pipe 42 into the secondary pressing cylinder 30, the piston 34 moves downward against the bias of the spring 32 and extends the operating rod 36.

Before proceeding with a detailed description of the mold 10 and the operational inter-relations of the primary cylinder 12 and the secondary cylinder 30, it is necessary to understand the sectional view of the mold 10 shown in FIGS. 1, 2 and 3. The sectional views shown are not true sectional views along the line 1—1 in FIG. 4. With reference to FIG. 4, the internal cavities 46, which receive glass to form the fins 48 on the article 50 manufactured by use of the mold 10, are actually defined by the mating surfaces of a plurality of mold inserts 51, 52, 53, 54, 55 and 56. Thus, if a true section were shown along the line 1—1, portions shaded in FIGS. 1, 2 and 3 would not be shaded, since no material was cut along the mating surfaces. However, these surfaces are shaded in order to distinguish the internal cavities 46 and vacuum passages 58 from those surfaces of the inserts which are in intimate abutting relationship. The cavities 46 and passages 58 are internal of the mold inserts 51 through 56. Returning now to FIG. 1, it may be seen that each of the mold inserts 51 through 56 has an upper face 60 which abuts an adjoining upper face and a lower face 61 which similarly abuts adjoining lower faces 61. A match line 62 between the mold inserts 54 and 53 and a match line 63 between the mold inserts 53 and 52 may be seen in FIG. 1. It may now clearly be seen from FIG. 1 that each of the internal cavities 46 communicates with a corresponding vacuum passage 58 at the bottom of the internal cavity 46. The vacuum passages 58 are formed as extremely thin slits in the bottom of the internal cavities 46, the vacuum passages 58 being on the order of only five thousandths of an inch in width. The extremely small width of the vacuum passages 58 is to ensure that molten glass will not flow into the vacuum passages 58 and thus distort the precise shape given to the fins 48 by the internal cavities 46. The vacuum passages 58 are, in turn, connected to a vacuum channel 64, which extends about the entire circumference of the mold 10. The vacuum channel 64 is connected at one point to a passageway 66 bored completely through the mold 10. A supply pipe 68 is inserted into the passageway 66. The supply pipe 68, in turn, is connected to a source of vacuum which is not shown in FIG. 1. The net result of the entire circuit just described is that a vacuum will be pulled from the internal cavities 46 through the vacuum passageways 58 into the vacuum channel 64 and through the passageway 66. Thus, any material placed in the internal cavities 46 will be firmly pulled against the walls of the internal cavities 46 by the vacuum passing through the vacuum passage 58. It may also be seen that the cavity of the mold 10 has a slightly outwardly flared upper portion 70 which cooperates with an inwardly flared portion 72 on the cavity forming plug 21 when the cavity forming plug 21 is inserted into the mold cavity to aid in forming the final configuration of the article 50 to be molded. Further, the upper faces 60 of the mold inserts 51 through 56 have a vertically upstanding portion 74 which cooperates with similar vertical portions on the upper surface ring 20 to seal off the cavity of the mold 10 during the glass pressing operation.

An opening or cylinder 76 in which a secondary pressing plunger 78 may operate has been provided completely through the lower portion of the mold 10. The lower portion of the secondary pressing plunger 78 is attached to a connecting rod 80 which is, in turn, pivotally connected to an operating lever 82. The operating lever 82 is pivotally mounted from the mold 10 on a pivot bracket 84. The end of the operating lever 82 opposite its connection to the connecting rod 80 is attached to a rod end member 86 which is carried by the operating rod 36 of the secondary cylinder 30. Since the pivot connection of the operating lever 82 to the pivot bracket 84 is intermediate the connecting rod 80 and the rod end member 86, the bias of the secondary cylinder 30 in a normally retracted position means that the secondary plunger 78 will likewise be held in a normally retracted position as shown in FIG. 1. Thus, there is a shallow well formed in the bottom of the mold 10 defined by the distance between the top of the cylinder 76 opening into the mold cavity and the top of the secondary pressing plunger 78.

Those skilled in the art will appreciate the configuration shown in FIG. 1 is merely for the purposes of illustration and normally would not be encountered in operation. Normally, the mold member 10 would be mounted on a rotatable member which would move to a glass feeding station to allow a molten glass charge to be fed into the mold 10. Only then would the mold 10 be moved under the primary pressing cylinder 12. Therefore, under normal condition, any time the mold 10 was under the cylinder 12, there would be molten glass in the mold 10.

Turning now to FIG. 2, the position assumed by the apparatus is that immediately after a molten glass charge has entered the mold 10 and the primary cylinder 12 has operated to press the primary plunger 18 into the molten glass charge within the mold 10. At this time, the vacuum has been turned on, and glass has been pulled into the internal cavities 46 to partially form the fins 48 for the article 50. However, it will be noted that a portion of the interior of the mold 10 adjacent the vertical faces 74 of the upper faces 60 of the mold inserts 51 through 56 has not been completely filled with glass. This occurs despite the fact that the mold seat ring 19 has been completely seated on top of the mold 10, and the rod 16 of the primary pressing cylinder 12 has completed its stroke. It should be clear at this point that no further pressure may be exerted on the glass by the primary pressing cylinder 12, since the mold seat ring 19 has been firmly placed on top of the mold 10. It is well known in the art of glass pressing, that it is very difficult to precisely control the weight of a molten glass charge fed to a mold 10. Thus, FIG. 2 illustrates that any excess glass in the glass charge is forced through the cylinder 76 formed in the bottom of the mold 10 and rests on top of the secondary pressing plunger 78. At this point, it may be seen that the switch actuating arm 22 has depressed the operating arm 24 of the switch 26, thereby closing the switch 26. As previously explained, this function will cause the secondary pressing cylinder 30 to extend its operating rod 36. This operation will cause the secondary pressing plunger 78 to be pressed upward against the glass which has been forced into the cylinder 76. The net result of this operation may be seen in FIG. 3. The secondary pressing plunger 78 is pushed upward to the limit of its stroke by the secondary cylinder 30, thus displacing a portion of the molten glass which was forced into the cylinder 76. This secondary pressing operation completely fills all of the cavities within the mold 10 to give a uniform article 50 of very precise configuration. It may be seen in FIG. 3 that there is still a very small residue of glass projecting into the cylinder 76. When the article 50 is removed from the mold 10, the small residue of glass will remain on the lower portion of the article 50.

Figure 6:
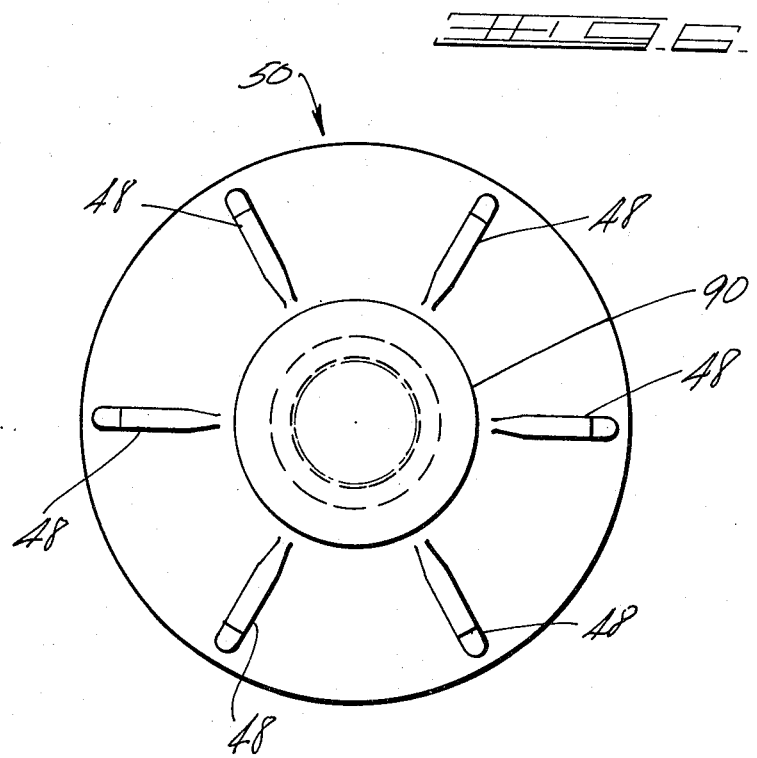
FIG. 6 is a bottom plan view of the article shown in FIG. 5.

Turning now to FIGS. 5 and 6, a small cylinder of residual glass 88 is shown in phantom lines attached to the article 50. The cylinder of residual glass 88 is the excess glass described in conjunction with FIG. 3 that remains after the secondary pressing operation has occurred. Such a small residual cylinder 88 occurs in almost every operation because of the difficulty in controlling exactly the weight of the glass charge fed to the mold 10. The cylinder of residual glass 88 is shown in phantom lines in FIG. 5, since this cylinder 88 is normally removed by a grinding operation after the article 50 has been removed from the mold 10. This may be accomplished since the area in which the residual cylinder 88 occurs is normally not a critical area such as are the fins 48 of the article 50. FIGS. 5 and 6 illustrate the complexity of the article 50 which may be molded with great precision using the apparatus of the present invention. In particular, note the complex configuration of the fins 48 which are blended into the main body portion 90. In addition, the internal flare 92 of the article 50 is also very carefully controlled by this process. The net result is that complex parts may be made with a degree of accuracy heretofore unobtainable in glass molding.

I claim:

1. In a system for precision pressing of glass articles wherein a primary plunger is stroked to press glass in a mold, the improvement which comprises: a mold body member having an article defining cavity formed therein, said cavity being open at its upper end to receive a molten glass charge and communicating with an opening through the lower portion of said body member, said body member being formed with a plurality of vacuum slots communicating with said cavity and with a vacuum channel, radially, outwardly displaced from said cavity communicating with said vacuum slots; movable means positioned in said opening; means connected to said movable means for powering said movable means for applying a secondary pressing stroke to a glass charge contained in said cavity; and control means responsive to the completion of the primary plunger pressing stroke, and connected to said means for powering said movable means, for initiating said secondary stroke.

2. In a system for precision pressing of glass articles, wherein a primary plunger is stroked to press glass in a mold, the improvement which comprises: a mold body member having an article defining cavity formed therein, said cavity being open at its upper end to receive a molten glass charge and communicating with an opening through the lower portion of said body member; a pressing piston positioned in said opening; a connecting rod attached to said pressing piston; a pivotally mounted operating lever attached at one end to said connecting rod; a secondary pressing cylinder; means connecting said secondary pressing cylinder to the end of said operating lever opposite said connecting rod; a source of air under pressure connected to said secondary pressing cylinder; a solenoid valve connected intermediate said secondary pressing cylinder and said source of air under pressure; a switch electrically connected to said solenoid valve to open the valve to allow a flow of air to said secondary pressing cylinder when said switch is activated; and an actuating arm carried by said primary pressing plunger for actuating said switch when said primary plunger completes its pressing stroke, thereby causing said pressing piston to apply a secondary pressing stroke to a glass charge contained in said cavity in response to the completion of the primary plunger pressing stroke.

3. Apparatus for precision pressing of glass articles from charges of molten glass delivered thereto comprising, in combination: reciprocal power means for developing a primary pressing pressure; a primary glass pressing plunger carried by said power means for imparting a primary pressing stroke to said glass charges; a mold for receiving said glass charges, said mold comprising a body member having an article defining cavity formed therein, said cavity being open at its upper end to receive said glass charges and communicating with an opening through the lower portion of said body member, said body member being formed with a plurality of vacuum slots communicating with said cavity and with a vacuum channel, radially, outwardly displaced from said cavity, formed in said body member and communicating with said vacuum slots; movable means positioned in said opening for applying a secondary pressing stroke to said glass charges contained in said cavity; means connected to said movable means for powering said movable means; and control means, responsive to the completion of said primary pressing stroke, connected to said means for powering said movable means for initiating said secondary stroke.

4. Apparatus for precision pressing of glass articles from charges of molten glass delivered thereto comprising, in combination: reciprocal power means for developing a primary pressing pressure; a primary glass pressing plunger carried by said power means for imparting a primary pressing stroke to said glass charges; a mold for receiving said glass charges, said mold comprising a body member having an article defining cavity formed therein, said cavity being open at its upper end to receive said glass charges and communicating with an opening through the lower portion of said body member; a movable pressing piston positioned in said opening for applying a secondary pressing stroke to said glass charges contained in said cavity; a connecting rod attached to said pressing piston; a pivotally mounted operating lever attached at one end to said connecting rod; a secondary pressing cylinder; means connecting said secondary pressing cylinder to the end of said operating lever opposite said connecting rod; a source of air under pressure connected to said secondary pressing cylinder; a solenoid valve connected intermediate said secondary pressing cylinder and said source of air under pressure; a switch, electrically connected to said solenoid valve to open the valve to allow a flow of air to said secondary pressing cylinder when said switch is actuated; and, an actuating arm carried by said primary pressing plunger for actuating said switch when said primary plunger completes its pressing stroke.

5. In the method of forming glass articles of precise dimensions, wherein a molten glass charge containing glass in excess of that required to form said article is delivered into an open-topped mold whose cavity has the precise external configuration of the article to be formed, the steps of:

moving a primary plunger having the precise internal dimensions of the article to be formed into said charge of glass;

finally positioning said primary plunger in a precise location relative to the cavity in said mold;

simultaneously with the movement of said primary plunger to its final position, closing the open top of said mold at a precise elevation;

flowing the excess volume of glass into an opening communicating with said cavity;

forcing a portion of said excess volume of glass, in response to the closing of the open top of said mold, back into said cavity through said opening to thereby completely fill said cavity; and applying a vacuum to said cavity for partially pulling said glass charge into conformity with said cavity.

6. The apparatus of claim 1, wherein said movable means comprises a pressing piston.

7. The apparatus of claim 6, wherein said means for powering said piston comprises, in combination: a connecting rod attached to said pressing piston; a pivotally mounted operating lever attached at one end to said connecting rod; a secondary pressing cylinder; means connecting said secondary pressing cylinder to the end of said operating lever opposite said connecting rod; and a source of air under pressure connected to said secondary pressing cylinder.

8. The apparatus of claim 7, wherein said control means comprises, in combination: a solenoid valve connected intermediate said secondary pressing cylinder and said source of air under pressure; a switch electrically connected to said solenoid valve to open the valve to allow a flow of air to said secondary pressing cylinder when said switch is actuated; and an actuating arm carried by a primary pressing plunger for actuating said switch when said primary plunger completes its pressing stroke.

9. The apparatus of claim 2, wherein said body member is formed with a plurality of vacuum slots communicating with said cavity, and a vacuum channel, radially, outwardly displaced from said cavity, formed in said body member and communicating with said vacuum slots.

10. The apparatus of claim 3, wherein said movable means comprises a pressing piston.

11. The apparatus of claim 10, wherein said means for powering said pressing piston comprises, in combination: a connecting rod attached to said pressing piston; a pivotally mounted operating lever attached at one end to said connecting rod; a secondary pressing cylinder; means connecting said secondary pressing cylinder to the end of said operating lever opposite said connecting rod; and, a source of air under pressure connected to said secondary pressing cylinder.

12. The apparatus of claim 11, wherein said control means comprises, in combination: a solenoid valve connected intermediate said secondary pressing cylinder and said source of air under pressure; a switch, electrically connected to said solenoid valve to open the valve to allow a flow of air to said secondary pressing cylinder when said switch is actuated; and, an actuating arm carried by said primary pressing plunger for actuating said switch when said primary plunger completes its pressing stroke.

13. The apparatus of claim 4, wherein said body member is formed with a plurality of vacuum slots communicating with said cavity, and a vacuum channel, radially, outwardly displaced from said cavity, formed in said body member and communicating with said vacuum slots.

14. The method of claim 5, further including the steps of:

removing said primary plunger from said cavity;

removing said formed article from said cavity; and removing the remaining excess volume of glass from said article.

* * * * *